Sept. 6, 1938.　　　　　G. FASSIN　　　　　2,129,527

DUST COUNTER

Filed July 8, 1936　　　　3 Sheets-Sheet 1

GUSTAVE FASSIN
INVENTOR

BY

ATTORNEYS

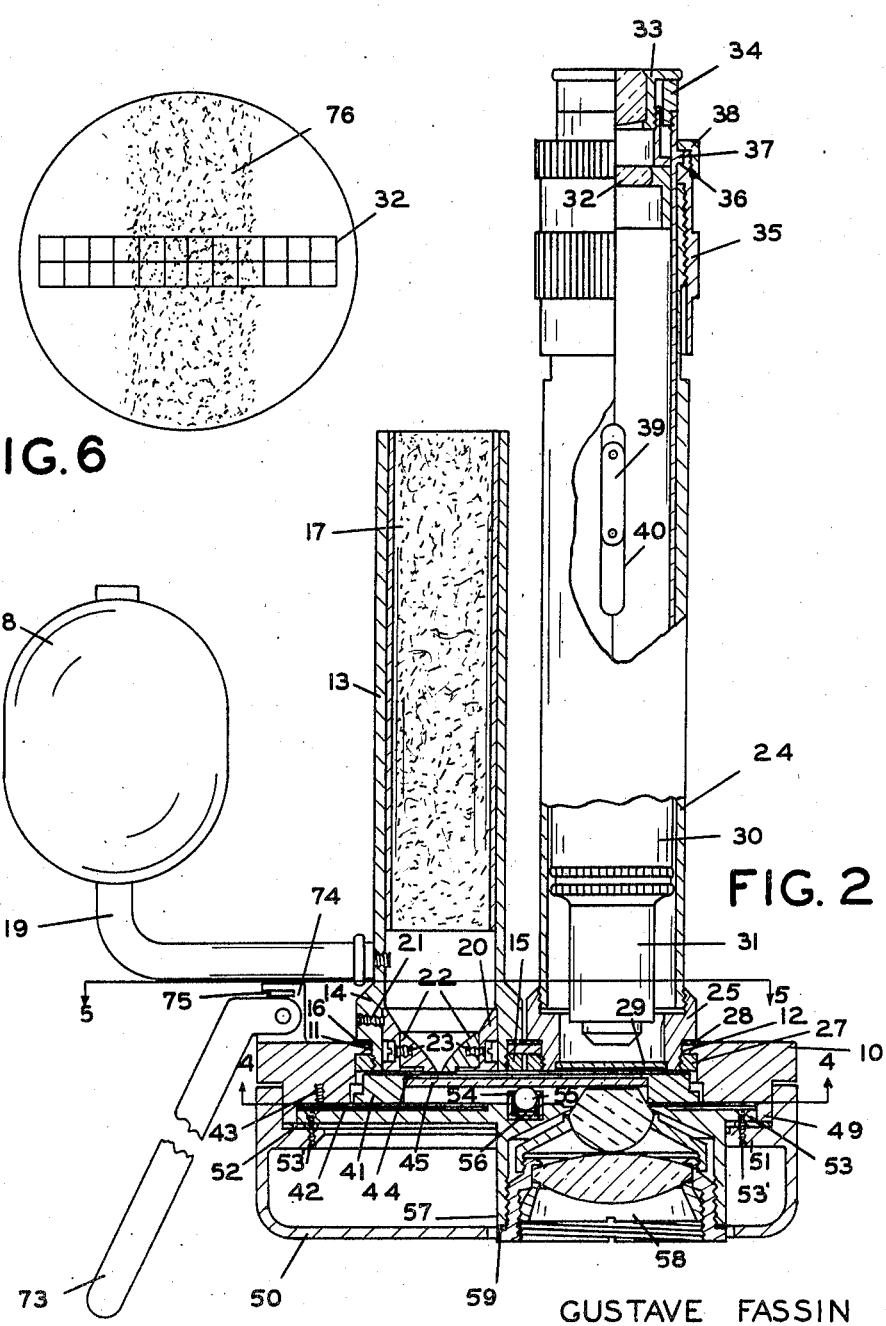

Sept. 6, 1938.　　　　G. FASSIN　　　　2,129,527
DUST COUNTER
Filed July 8, 1936　　　3 Sheets-Sheet 3

GUSTAVE FASSIN
INVENTOR
BY
ATTORNEYS

Patented Sept. 6, 1938

2,129,527

UNITED STATES PATENT OFFICE 2,129,527

DUST COUNTER

Gustave Fassin, Irondequoit, N. Y., assignor to Bausch & Lomb Optical Company, Rochester, N. Y., a corporation of New York Application July 8, 1936, Serial No. 89,619

10 Claims. (Cl. 88—14)

The present invention relates to an apparatus for determining the number of particles of dust or other material in the air.

One of the objects of the present invention is to provide a new and improved device for determining the number of dust particles in the air. Another object is to provide a new and improved means for obtaining a dust specimen on a slide. A further object is to provide a dust counter in which the slide can be readily and easily inserted or removed. A still further object is to provide a dust counter having a simple and efficient means for determining the number of dust particles in a specimen. These and other objects and advantages reside in certain novel features of construction, arrangement and combination of parts as will hereinatfer be more fully set forth and pointed out in the appended claims.

Referring to the drawings:

Fig. 2 is a vertical section thereof.

Fig. 6 shows the relation of the dust specimen and the graticule in the field of view.

Figure 3:
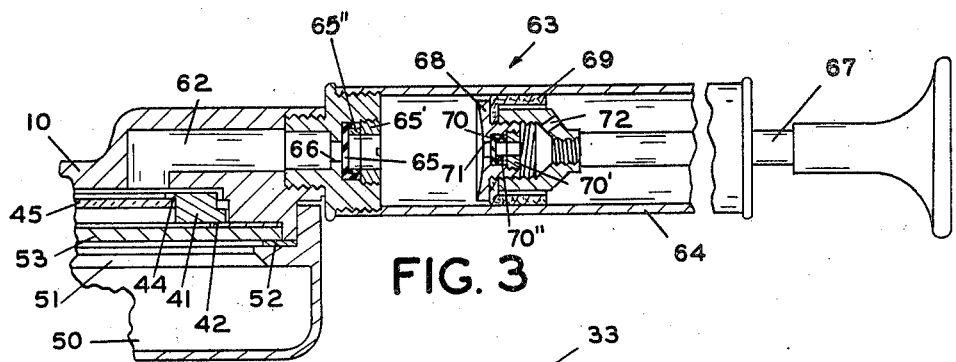
Fig. 3 is a fragmentary vertical section of the air pump and connections.
Figure 1:
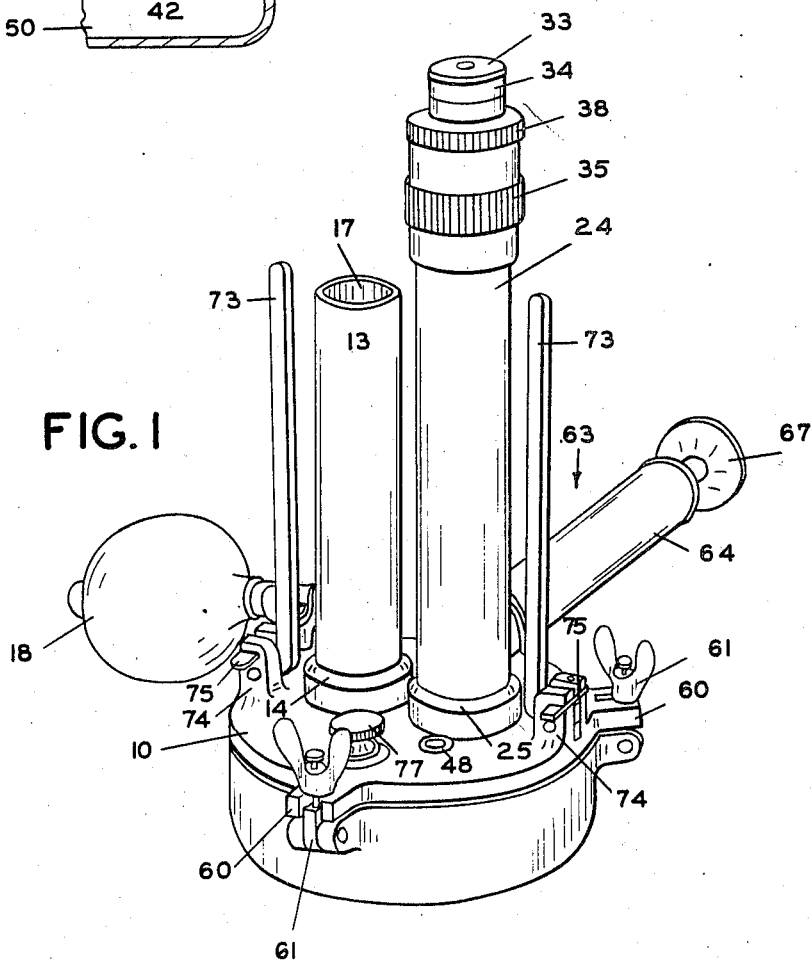
Fig. 1 is a perspective view of a dust counter embodying the present invention.
Figure 4:
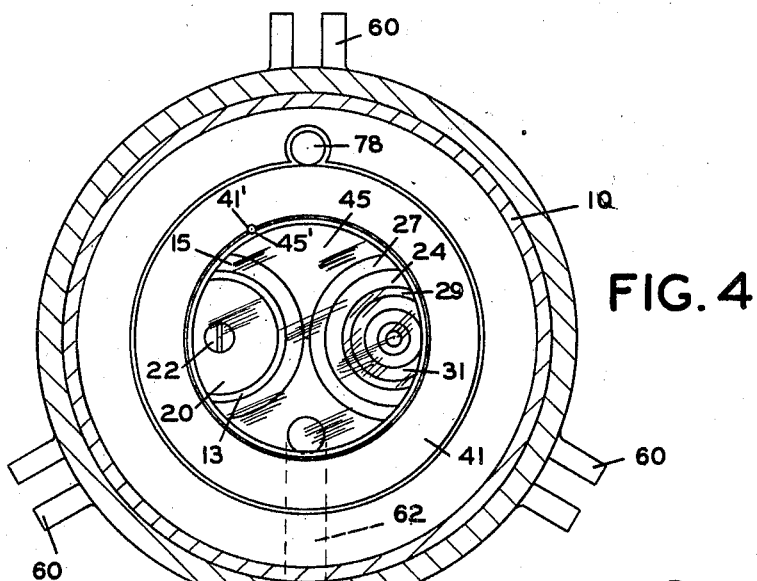
Fig. 4 is a section taken on line 4—4 of Fig. 2.
Figure 5:
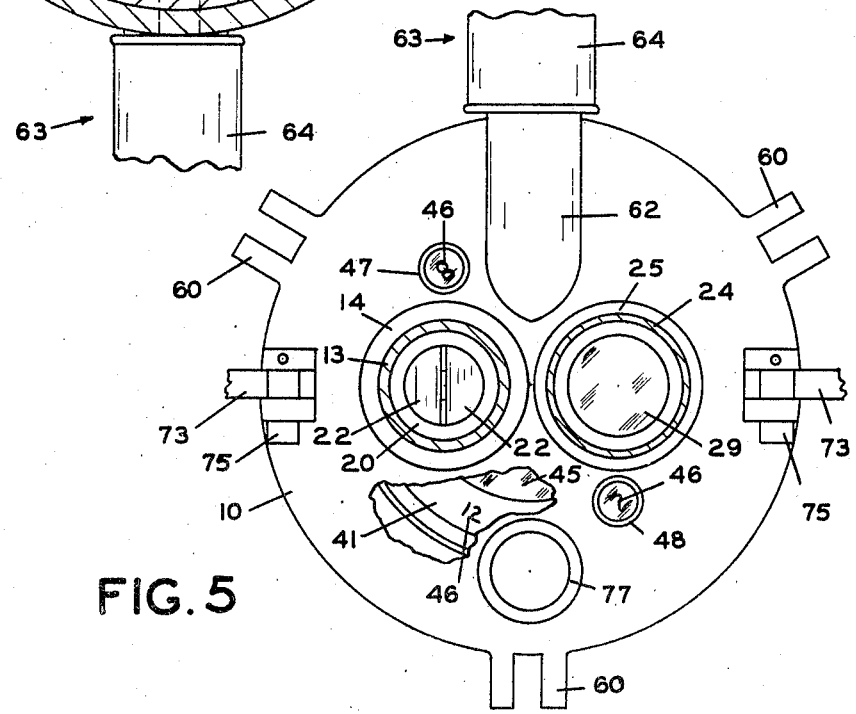
Fig. 5 is a section taken on line 5—5 of Fig. 2.

One embodiment of the present invention is illustrated in the drawings wherein 10 designates a base having openings 11 and 12 in its top. A moistening chamber 13 having a shoulder 14 near its lower end, extends through the opening 11 and is locked in position by a threaded ring 15. A resilient gasket 16 is placed between the shoulder 14 and the top of the base 10 to form an air tight connection between the chamber and the base. A suitable moistening element such as a piece of damp blotting paper 17 is secured in the chamber 13 and a rubber bulb 18 communicates with the chamber 13 through a tube 19 to change the air in the chamber. A carrier ring 20 is fixed in the lower end of the chamber 13 by means of screws 21 and carries two slot forming members 22 secured therein by screws 23. As shown in Figs. 4 and 5, the carrier ring 20 and members 22 combine to form a narrow parallel sided slot.

A sleeve 24 having a shoulder 25 near its lower end extends through the opening 12 and is locked in position by a threaded ring 27. A resilient gasket 28 is located between the shoulder 25 and the top of the base 10 to form an air tight connection. The bottom of the sleeve 24 is closed by means of a window 29. Slidably mounted within the sleeve 24 is a microscope tube 30 carrying an objective 31, a graticule 32 and an ocular 33. The ocular 33 is adjustably supported by a ring 34 which is threaded in the microscope tube 30 so that the ocular may be focused.

A focusing ring 35 threaded on the upper end of the sleeve 24 is provided with a shoulder 36 against which the flange 37 of the microscope tube 30 is held by an annular ring 38 threaded on the focusing ring 35. The sleeve 24 has an inward projection 39 which cooperates with a slot 40 in the microscope tube 30 to prevent rotation of the tube in the sleeve. Thus rotation of the focusing ring 35 will move the microscope tube 30 along its axis without disturbing the orientation of the graticule 32 relative to the field of view.

A ring 41 is rotatably mounted within the base 10 and is held in place by an annular plate 42 secured to the base 10 by screws 43. At its upper end the ring 41 has an internal flange 44 against which the slide 45 is pressed. A series of index marks 46 are formed on the top of the ring 41 and are visible through windows 47 and 48 in the top of the base 10 to indicate, respectively, the portion of the slide 45 under the moistening chamber 13 and that under the microscope 30. A key 41' within the ring 41 cooperates with a notch 45' in the slide 45.

The base 10 has a downwardly extending inset flange 49 and the cover member 50 extends around the outside of the flange 49 and has an internal shoulder 51 against which the end of the flange abuts. A suitable gasket 52 is located between the flange 49 and the shoulder 51 to form an air tight connection. A circular plate 53 is secured to the shoulder 51 within the flange 49 by screws 53' and carries a housing 54 within which a ball 55 is pressed by a spring 56 against the center of the slide 45, thus pressing the slide against the flange 44 of the ring 41.

Beneath the microscope 30 and in axial alignment therewith, the plate 53 has a downwardly extending tubular portion 57 against which a dark field condenser 58 is secured. This condenser 58 may be of any well known form. The connection between the condenser 58 and the tubular portion 57 is made air tight by a suitable gasket 59.

The base 10 is provided with a plurality of bifurcated projections 60 and the cover member 50 has a plurality of pivoted wing nuts 61 for securing the cover member tightly to the base 10. The only place that air can enter the housing formed by the base 10 and the cover member 50 is through the slot formed by the two members 22.

In order to draw air through this slot, an air passage 62 is formed in the top of the base 10 and connected to a suction pump indicated generally at 63. This pump comprises the usual tube 64 and has an intake valve formed by a strip 65 of dental rubber or the like clamped across a small opening 66 by a locking ring 65' and a washer 65". The plunger element has an operating handle 67 extending into the tube 64 to a piston 68 which has air tight engagement with the tube 64 through a felt or other suitable washer 69. The piston valve is also preferably formed of a strip of soft rubber 70 clamped across a small aperture 71 by a locking ring 70' and a washer 70". The air coming through the aperture 71 passes the piston through a second aperture 72. The soft rubber valves 65 and 70 have a special advantage in this particular pump since they cannot be held open by dust particles on the valve seat.

Two elongated rods 73 are pivoted in extensions 74 on top of the base 10 and may be pivoted downward to serve as legs. Latches 75 serve to hold the legs 73 in either an operative or an inoperative position. The pump 63 serves as a third leg to hold the base 10 in such a position that the microscope 30 is at a comfortable and convenient viewing angle.

In operation, the dust counter is taken to the location where the air is to be tested and the bulb 18 is actuated until the air in the chamber 13 is a representative sample of the air at the location. The moistening element 17 serves to dampen any dust present in the air within the chamber 13. The suction pump 63 is then actuated to draw the air from the chamber 13 through the slot formed by the members 22 and the dampness causes any particles of dust to adhere to the slide 45 in a band indicated at 76 in Fig. 6. This band 76 is perpendicular to the axis of the graticule 32 in the field of view. Twelve such bands can be formed on each slide 45 and these bands may then be immediately examined under the microscope 30. The slide 45 can be rotated so that the part under the slot is positioned under the microscope by means of an operating member which has a knob 77 above the base 10 and which extends into the base and terminates in a drive portion 78 having frictional engagement with the edge of the ring 41. The slide 45 can also be removed after the samples 76 have been taken and examined at a later time.

By counting the dust particles in a certain area determined by the graticule, the number of dust particles in each cubic foot of air can be determined.

From the foregoing, it will be apparent that I am able to attain the objects of my invention and provide a new and improved dust counter which is simple and effective and in which the slide is readily removable and replaceable. Various modifications can, of course, be made without departing from the spirit of my invention or the scope of the appended claims.

I claim:

1. A device of the character described comprising a base, a slide rotatably carried by said base, an air moistening chamber carried by said base, said chamber having a narrow slot adjacent said slide, means for directing a measured amount of air from said chamber through said slot and against said slide, a microscope carried by said base, and means for rotating the slide so that the part adjacent said slot will be brought into the field of the microscope.

2. A device of the character described comprising a base, a slide rotatably carried by said base, an air moistening chamber carried by said base, said chamber having a narrow slot adjacent said slide, means for changing the air in said chamber, means for directing a measured amount of air from said chamber through said slot and against said slide, a microscope carried by said base, and means for rotating the slide so that the part adjacent said slot will be brought into the field of the microscope.

3. In a device of the character described, a base, a moistening chamber fixedly mounted on said base and having a narrow slot at its lower end, means for changing the air in said chamber, an annular ring rotatably mounted in said base beneath said slot, an internal flange at the upper end of said ring, a slide, means for pressing said slide into contact with said flange for rotation with said ring, and a suction pump opening into the space between the slide and the chamber to cause the air from the chamber to impinge against said slide through said slot.

4. In a device of the character described, a base, a moistening chamber fixedly mounted on said base and having a narrow slot at its lower end, means for changing the air in said chamber, an annular ring rotatably mounted in said base beneath said slot, an internal flange at the upper end of said ring, a slide, means for pressing said slide into contact with said flange for rotation with said ring, and a suction pump opening into the space between the slide and the chamber to cause the air from the chamber to impinge against said slide through said slot, said suction pump having valves each consisting of a strip of soft resilient material secured across an orifice.

5. In a device of the character described, a base, a moistening chamber fixedly mounted on said base and having a narrow slot at its lower end, an annular ring rotatably mounted in said base beneath said slot, an inward flange at the upper end of said ring, a slide, means for pressing said slide into contact with said flange for rotation with said ring, and means for rapidly withdrawing the air from the space between the slide and the chamber whereby air from said chamber will be drawn through said slot to impinge against said slide.

6. A device of the character described comprising a base, a moistening chamber carried on the upper side of said base and having a narrow slot at its lower end, a microscope carried on the upper side of said base, an annular ring rotatably mounted within said base with its axis of rotation equidistant from said slot and the field of view of the microscope, a slide adapted to fit within said ring and extend beneath said slot, a closure member for the lower side of said base, and means on said closure member for urging said slide into air tight engagement with said ring.

7. A device of the character described comprising a base, a moistening chamber carried on the upper side of said base and having a narrow slot at its lower end, a microscope carried on the upper side of said base, an annular ring rotatably mounted within said base with its axis of rotation equidistant from said slot and the field of view of the microscope, a slide adapted to fit within said ring and extend beneath said slot, a closure member for the lower side of said base, a dark field condenser carried by said closure member beneath said microscope, and means on said closure member for urging said slide into air tight engagement with said ring.

8. A device of the character described comprising a base, a microscope mounted on the top of said base in air tight relation thereto, a moistening chamber mounted on the top of said base in air tight relation thereto, said chamber having an orifice through which air can pass, a slide holder rotatably mounted within said base with its axis of rotation equidistant from the orifice and the field of view of the microscope, said holder being open at its lower side to receive a slide, a slide adapted to fit in said holder and extend beneath said orifice, a closure member forming an air tight connection with the bottom of said base and means on said member for urging said slide toward said base.

9. A device of the character described comprising a base, a microscope mounted on the top of said base in air tight relation thereto, a moistening chamber mounted on the top of said base in air tight relation thereto, said chamber having an orifice through which air can pass, a slide holder rotatably mounted within said base with its axis of rotation equidistant from the orifice and the field of view of the microscope, said holder being open at its lower side to receive a slide, a slide adapted to fit in said holder and extend beneath said orifice, a closure member forming an air tight connection with the bottom of said base, means on said member for urging said slide toward said base, and means for drawing air from said chamber through said orifice and against said slide.

10. In a device of the character described, a base, a moistening chamber mounted on said base and having an elongated slot therein, a microscope mounted on said base, a slide adapted to extend beneath said slot and said microscope, means for rotatably mounting said slide in said base with its axis of rotation equidistant from said slot and the optical axis of said microscope, means for forcing air from said chamber through said slot and against said slide, and an elongated graticule in the field of view of said microscope, the longitudinal axis of said graticule being perpendicular to the longitudinal axis of said slot in said field of view.

GUSTAVE FASSIN.